United States Patent
Baumann et al.

(10) Patent No.: US 10,389,263 B2
(45) Date of Patent: *Aug. 20, 2019

(54) MOTOR DRIVE WITH SILICON CARBIDE MOSFET SWITCHES

(71) Applicant: Rockwell Automation Technologies, Inc., Mayfield Heights, OH (US)

(72) Inventors: Kevin Baumann, Cedarburg, WI (US); Richard Lukaszewski, New Berlin, WI (US); Rangarajan Tallam, Germantown, WI (US); Lixiang Wei, Mequon, WI (US); Lee Gettelfinger, Mequon, WI (US); Garron Morris, Whitefish Bay, WI (US); Bruce Weiss, Milwaukee, WI (US); Neil Gollhardt, Fox Point, WI (US); Navid R. Zargari, Cambridge (CA); William Brumsickle, Madison, WI (US); Robert Wright Reese, Germantown, WI (US); Stephen E. Denning, Silver Lake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/722,071

(22) Filed: Oct. 2, 2017

(65) Prior Publication Data
US 2018/0026544 A1 Jan. 25, 2018

Related U.S. Application Data

(63) Continuation of application No. 14/698,925, filed on Apr. 29, 2015, now Pat. No. 9,787,212.

(Continued)

(51) Int. Cl.
*H02M 5/458* (2006.01)
*H02P 27/06* (2006.01)
*H02M 1/08* (2006.01)

(52) U.S. Cl.
CPC ............ *H02M 5/458* (2013.01); *H02P 27/06* (2013.01); *H02M 1/08* (2013.01); *H02M 5/4585* (2013.01); *Y02B 70/1483* (2013.01)

(58) Field of Classification Search
CPC ...... H02M 5/458; H02M 1/08; H02M 5/4584; H02P 27/06; Y02B 70/1483
(Continued)

(56) References Cited

U.S. PATENT DOCUMENTS 5,396,085 A * 3/1995 Baliga .................. H01L 27/085
257/77
5,543,703 A * 8/1996 Kusase ............... H01L 29/7803
322/16

(Continued)

FOREIGN PATENT DOCUMENTS

CN 101933219 A 12/2010
CN 102099992 A 6/2011
(Continued)

OTHER PUBLICATIONS

Rebbereh et al., "First inverter using silicon carbide power switches only", European Conference on Power Electronics, Jan. 1, 2003, pp. 1-10, XP008097914, ISBN: 978-90-75815-07-9.
(Continued)

*Primary Examiner* — Shawki S Ismail
*Assistant Examiner* — Devon A Joseph
(74) *Attorney, Agent, or Firm* — Fay Sharpe LLP

(57) ABSTRACT

Motor drive power conversion systems are provided including a rectifier and a switching inverter, wherein the switching devices of the rectifier, the inverter and/or of a DC/DC
(Continued)

converter are silicon carbide switches, such as silicon carbide MOSFETs. Driver circuits are provided for providing bipolar gate drive signals to the silicon carbide MOSFETs, including providing negative gate-source voltage for controlling the off state of enhancement mode low side drivers and positive gate-source voltage for controlling the off state of enhancement mode high side drivers.

20 Claims, 9 Drawing Sheets

Related U.S. Application Data

(60) Provisional application No. 61/988,744, filed on May 5, 2014.
(58) Field of Classification Search
USPC .......................................................... 318/505
See application file for complete search history.

(56) References Cited

U.S. PATENT DOCUMENTS

| | | | | |
|---|---|---|---|---|
| 5,999,387 | A * | 12/1999 | Roesch | H02H 9/025 361/58 |
| 6,331,794 | B1 * | 12/2001 | Blanchard | H03K 17/063 327/112 |
| 6,538,279 | B1 * | 3/2003 | Blanchard | H03K 17/04123 257/296 |
| 6,972,918 | B2 * | 12/2005 | Kokami | G11B 5/54 360/69 |
| 7,965,484 | B2 | 6/2011 | Baudesson et al. | |
| 8,198,676 | B2 * | 6/2012 | Iwamuro | H01L 29/41741 257/330 |
| 8,476,859 | B2 | 7/2013 | Bortolus et al. | |
| 8,558,521 | B2 | 10/2013 | Chang et al. | |
| 8,902,616 | B2 | 12/2014 | Royak et al. | |
| 8,994,442 | B2 | 3/2015 | Konstantinov | |
| 9,083,274 | B2 | 7/2015 | Liu et al. | |
| 2005/0270806 | A1 * | 12/2005 | Zhu | H02M 3/33576 363/17 |
| 2008/0316781 | A1 * | 12/2008 | Liu | H05B 33/0815 363/80 |
| 2009/0212726 | A1 * | 8/2009 | Baudesson | H02M 1/32 318/400.3 |
| 2010/0081058 | A1 | 4/2010 | Sano et al. | |
| 2010/0309700 | A1 | 12/2010 | Maeda et al. | |
| 2011/0084673 | A1 | 4/2011 | Chang et al. | |
| 2011/0084674 | A1 | 4/2011 | Cadoux | |
| 2012/0081058 | A1 * | 4/2012 | Bortolus | H02K 11/001 318/490 |
| 2012/0126741 | A1 * | 5/2012 | El-Refaie | H02P 27/08 318/812 |
| 2013/0043817 | A1 * | 2/2013 | Shibuya | H02P 6/182 318/400.33 |
| 2013/0094258 | A1 * | 4/2013 | Royak | H02M 1/32 363/89 |
| 2015/0207424 | A1 * | 7/2015 | Okamoto | H02M 3/33569 363/17 |
| 2016/0079975 | A1 * | 3/2016 | Kinzer | H03K 17/687 327/109 |
| 2016/0325777 | A1 * | 11/2016 | Mori | H02P 25/22 |
| 2017/0126120 | A1 * | 5/2017 | Chakraborty | H02M 3/158 |

FOREIGN PATENT DOCUMENTS

| | | |
|---|---|---|
| CN | 103534916 A | 1/2014 |
| DE | 100 11 523 A1 | 9/2001 |

OTHER PUBLICATIONS

"High Temperature, Silicon Carbide, Power MOSFET, NASA SBIR Success", Cree Research, Inc. Durham NC, Feb. 28, 2008, downloaded from the Internet Mar. 28, 2015 at http://sbir.nasa.gove/SBIR/successes/ss/3-021text.html, 1 page.
"Silicon Carbide Power MISFETs Replace Silicon Devices in High Voltage Power Electronics", ECN, Product Releases, downloaded from the Internet at http://www.ecnmag.com/product-releases/2011/01/silicon-carbide-power-mosfets-replace-silicon-devices-high-voltage-power-electronics, 3 pages.
Callanan, "Silicon carbide MOSFETs: Superior switching technology for power electronics applications", article posted Sep. 12, 2011 at http://www.electronicproducts.com/Power-Products/Power_Semiconductors?Silicon_carbide_MOSEETs_Superior_switching_technology_for-power-electronics_applications.aspx, 11 pages.
Cree, CPMF-1200-S080B, Z-Fet™ Silicon Carbide MOSFET, N-Channel Enhancement Mode Bare Die, CPMF-1200-S080B Rev. A, 2011, 10 pages.
Snefjella, Silicon Carbide Technologies for High Temperature Motor Drives, NTNU Norwegian University of Science and Technology, Jun. 2011, 160 pages, (uploaded as Part I and Part II).

* cited by examiner

MOTOR DRIVE WITH SILICON CARBIDE MOSFET SWITCHES

REFERENCE TO RELATED APPLICATION

This application is a continuation of U.S. patent application Ser. No. 14/698,925, filed Apr. 29, 2015, entitled MOTOR DRIVE WITH SILICON CARBIDE MOSFET SWITCHES, which claims priority to and the benefit of, U.S. Provisional Patent Application No. 61/988,744, filed May 5, 2014, and entitled MOTOR DRIVE WITH SILICON CARBIDE MOSFET SWITCHES, the entirety of which applications are hereby incorporated by reference.

BACKGROUND INFORMATION

The subject matter disclosed herein relates to power conversion systems.

BRIEF DESCRIPTION

One or more aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems for driving a motor or other AC load with silicon carbide switches.

DETAILED DESCRIPTION

Figure 1:
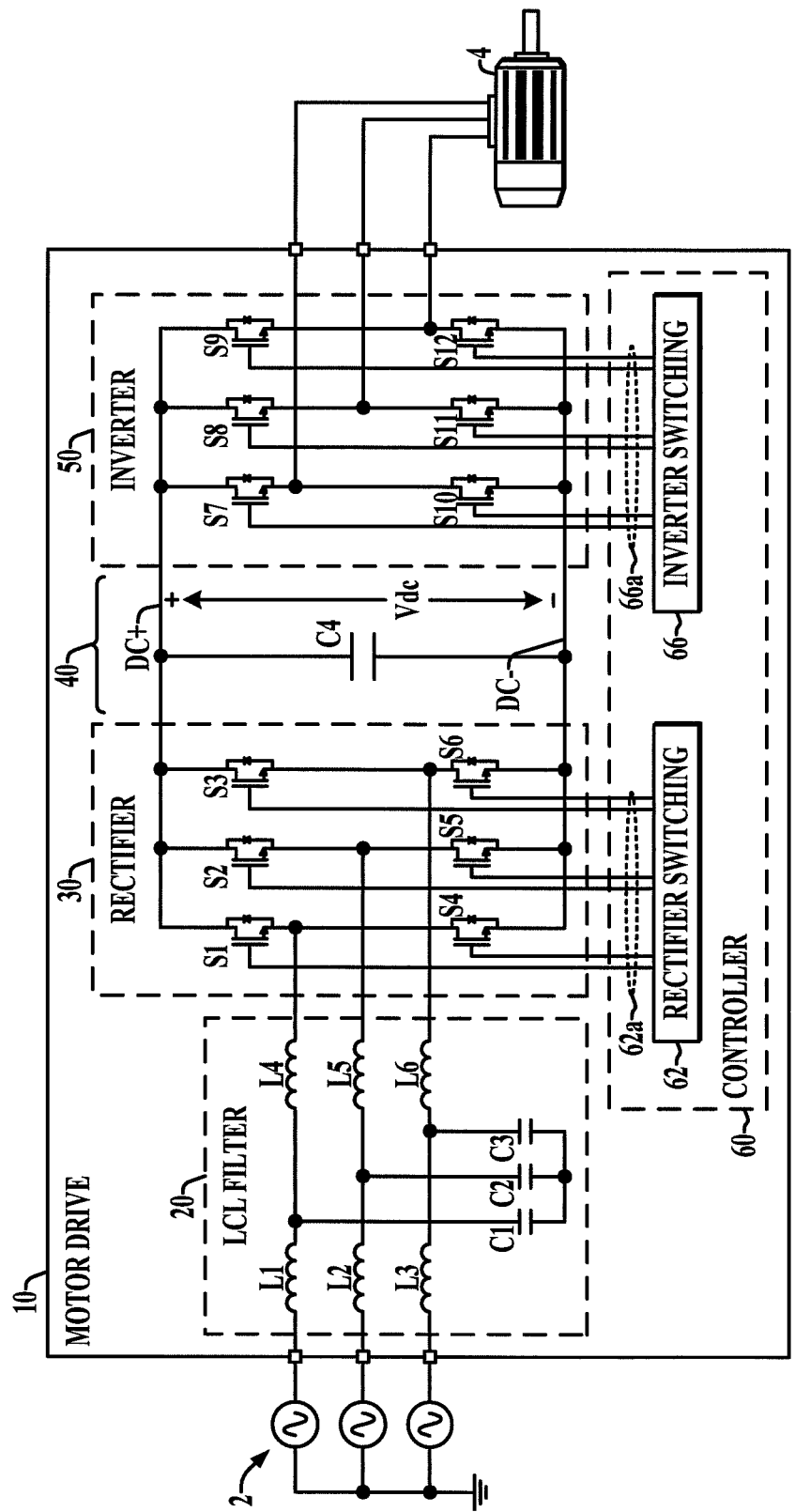
FIG. 1 is a schematic diagram.
Figure 2:
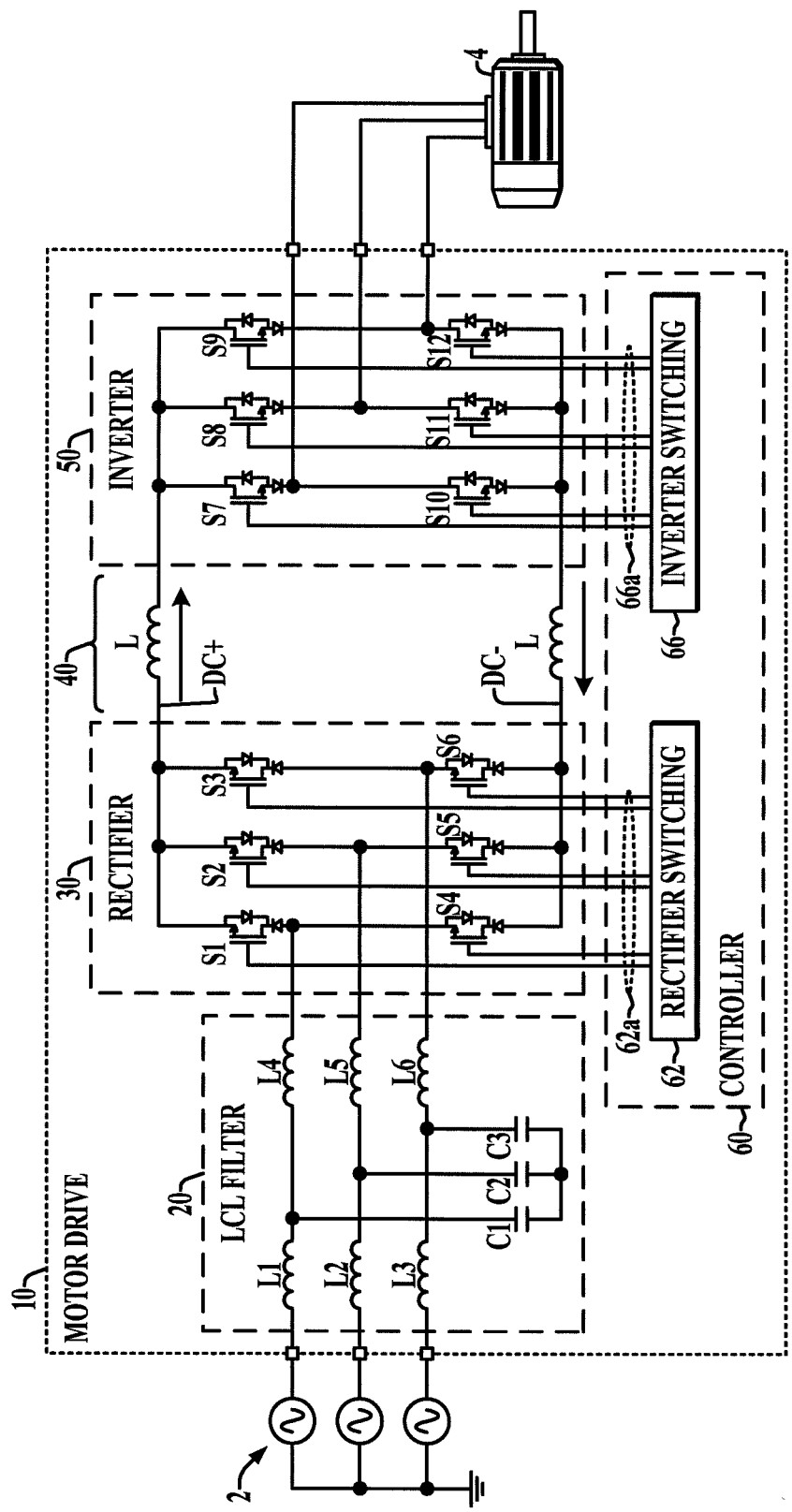
FIG. 2 is a schematic diagram.

Referring initially to FIGS. 1 and 2, FIG. 1 illustrates an exemplary motor drive power conversion system 10 receiving single or multiphase AC input power from an external power source 2. The illustrated example receives a three phase input, but other multiphase embodiments are possible. The motor drive 10 includes an input filter circuit 20, in this case a three phase LCL filter having grid side inductors L1, L2 and L3 connected to the power leads of the power source 2 as well as series connected converter side inductors L4, L5 and L6, with filter capacitors C1, C2 and C3 connected between the corresponding grid and converter side inductors and a common connection node, which may but need not be connected to a system ground. Although illustrated in the context of a three phase LCL filter circuit 20, other alternate circuit configurations can be used, including without limitation LC filters. Moreover, although illustrated as including an input filter circuit 20, the filter circuit 20 may be omitted or modified in other embodiments. The motor drive 10 includes a rectifier 30, a DC bus or DC link circuit 40 and an output inverter 50, with the rectifier 30 and the inverter 50 being operated by a controller 60. The controller 60 includes a rectifier controller 62 and an inverter controller 66 respectively providing rectifier and inverter switching control signal 62a and 66a to the rectifier 30 and the inverter 50 to operate switches thereof. In certain implementations, the inverter switching controller 66 provides the control signal 66a in order to selectively operate the individual inverter switching devices S7-S12 to provide a variable frequency, variable amplitude output to drive the motor load 4, and the inverter switching controller 66 also provides a setpoint or desired DC signal or value to the rectifier switching controller 62. The rectifier switching controller 62, in turn, operates the rectifier switching devices S1-S6 in order to provide a regulated DC voltage Vdc across a DC link capacitor C4 in the intermediate link circuit 40 according to the desired or setpoint DC signal or value.

The controller 60 and the components thereof may be implemented as any suitable hardware, processor-executed software, processor-executed firmware, logic, and/or combinations thereof wherein the illustrated controller 60 can be implemented largely in processor-executed software or firmware providing various control functions by which the controller 60 receives feedback and/or input signals and/or values (e.g., setpoint(s)) and provides rectifier and inverter switching control signals 62a and 66a to operate the rectifier switching devices S1-S6 and switches S7-S12 of the inverter 50 to convert input power for providing AC output power to drive the load 4. In addition, the controller 60 and the components thereof can be implemented in a single processor-based device, such as a microprocessor, microcontroller, FPGA, etc., or one or more of these can be separately implemented in unitary or distributed fashion by two or more processor devices. Moreover, the switching controllers 62 and 66 may provide any suitable form of switch control, including one or more forms of pulse width modulation (PWM) control in providing the switching control signals 62a and/or 66a and various embodiments. Furthermore, the switching control components 62 and 66 may include suitable driver circuitry for providing gate control signals to operate silicon carbide switching devices S1-S12.

FIG. 2 illustrates another embodiment of a variable frequency, variable amplitude motor drive power conversion system 10, in this case a current source converter including a current source rectifier 30 with silicon carbide switching devices S1-S6 and a current source inverter 50 with silicon carbide switching devices S7-S12, where the converter stages 30 and 50 are coupled with one another via an intermediate DC link circuit 40 including one or more DC link chokes or inductors L. In this case, the rectifier switching controller 62 operates the rectifier switching devices S1-S6 in order to provide a regulated DC link current in the intermediate circuit 40, and the current source inverter 50 provides variable frequency, variable amplitude output currents to drive the motor load 4.

The illustrated motor drives 10 in FIGS. 1 and 2 implement an active front end (AFE) including a switching rectifier (also referred to as a converter) 30 receiving three-phase power from the source 2 through the filter circuit 20. The rectifier 30 includes silicon carbide MOSFET rectifier switches S1-S6 operable according to a corresponding rectifier switching control (e.g., gate) signals 62a to selectively conduct current when actuated. In addition, as seen in FIGS. 1 and 2, diodes are connected across the individual silicon carbide switches S1-S6, although not a strict requirement of all embodiments. Operation of the rectifier switches S1-S6 is controlled according to pulse width modulated rectifier switching control signals 62a in certain embodiments to provide active rectification of the AC input power from the source 2 to provide a DC bus voltage Vdc across a DC bus capacitance C4 in a DC link circuit 40 (FIG. 1) and/or to provide a DC link current in the intermediate circuit 40 (FIG. 2). The rectifier 30, moreover, may be controlled in a regeneration mode, with the switching devices S1-S6 operative according to corresponding switching control signal 62a from the controller 62 to regenerate power from the intermediate circuit 40 through the filter 20 (if included) and back to the source 2. Moreover, the front end rectifier 30 may be controlled in order to implement other functions in the motor drive 10, including without limitation power factor correction, selective harmonic elimination, etc. In various embodiments, moreover, the active rectifier 30 may be replaced with a passive rectifier, with a switching inverter 50 including a plurality of silicon carbide switching devices S7-S12. Moreover, an active rectifier 30 may be operated at or near a line frequency of the AC input source (fundamental front end or FFE operation) or at a higher and possibly variable switching frequency, such as an active front end (AFE) rectifier.

The inverter switches S7-S12 in this embodiment are also silicon carbide MOSFET devices coupled to receive power from the DC bus 40 and to provide AC output power to the motor or other load 4. Moreover, while the illustrated inverter 50 is a three-phase stage, other single or multiphase inverters 50 may be provided in various embodiments. The silicon carbide MOSFET switches S7-S12 are operated according to gate control switching control signals 66a from the inverter switching control component 66, and can be any form of silicon carbide MOSFETs or other silicon carbide-based semiconductor switching devices. The controller 60 in certain embodiments receives various input signals or values, including setpoint signals or values for desired output operation, such as motor speed, position, torque, etc., as well as feedback signals or values representing operational values of various portions of the motor drive 10.

Silicon carbide (SiC), also known as carborundum, is a compound including silicon and carbon and can be any suitable stoichiometry to implement a semiconductor switching device S1-S12. Silicon carbide switching devices S1-S12, moreover, are preferably high temperature/high voltage devices, suitable for use in various motor drives 10. For example, the switches S1-S12 are each rated at 1200 V and 300 A in certain embodiments, as shown in the attached appendix, and the drive 10 in the non-limiting embodiment of FIG. 1 is a low-voltage variable frequency drive with a rating from about 50 W through about 1 kW to drive motor loads from about 0.25 hp through 30 hp at voltages in the range of about 100-600 V. The medium voltage current source converter embodiment 10 of FIG. 2 has a power range of about 200-3400 hp and supply voltages of about 2400-6600V AC. In certain embodiments, the silicon carbide switching devices S1-S12 preferably have fairly large continuous current ratings, for example, at 25° C. and/or any higher rated temperature seen in a closed control cabinet or other motor drive enclosure (not shown), and have controllable threshold voltages over a temperature range of about 25° C. through about 200° C., and low RDSON over such normal operating temperature ranges. In addition, the switching devices S1-S12 preferably have high switching energy ratings.

Figure 4:
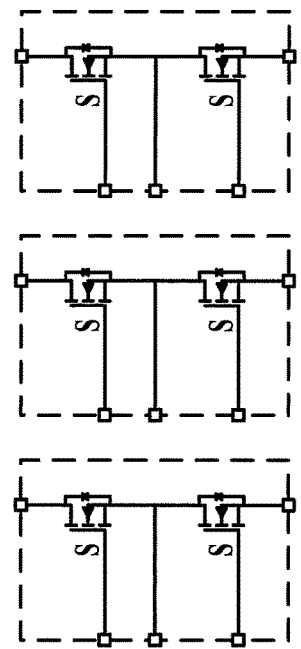
FIG. 4 is a schematic diagram.
Figure 3:
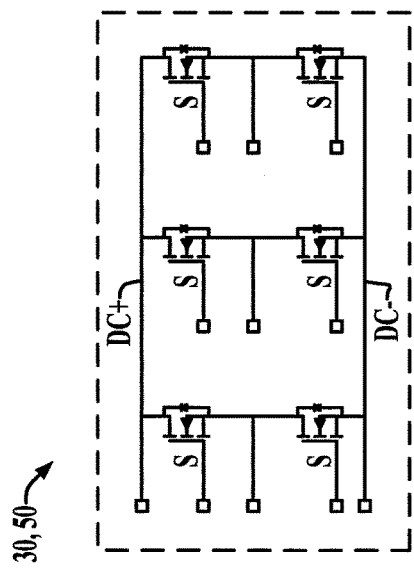
FIG. 3 is a schematic diagram.

The silicon carbide switching devices S1-S6 of the active front end rectifiers 30, and the silicon carbide inverter switches S7-S12, moreover, can be any suitable form of field effect transistor, such as an enhancement mode or depletion mode MOSFET in various embodiments. In the non-limiting examples of FIGS. 1 and 2, the switching devices are enhancement mode MOSFETs, with the controller 60 providing suitable control signals (e.g., Vgs) accordingly. Other embodiments are possible, for example, in which all the switching devices S1-S6 and S7-S12 of a given one of the conversion stages 30, 50 can be either enhancement mode or depletion mode FETs. FIGS. 3 and 4 illustrate further exemplary embodiments, and which two or more of the switching devices S1-S12 can be provided in a single module or package. For instance, FIG. 3 illustrates an enhancement mode N-channel silicon carbide MOSFET embodiment including six switching devices S which can be interconnected for providing a silicon carbide switching rectifier 30 and/or switching inverter 50. In this case, terminals are provided for the source and drain terminals of the included switches S, as well as for the control gates thereof. FIG. 4 illustrates another possible implementation, including a set of three half-bridge silicon carbide MOSFET modules, in this case N-channel devices S, where each module includes two silicon carbide switches S. The switching devices S and/or modules containing multiple such switching devices S, moreover, may be physically packaged and/or structure to provide drop-in replacement for IGBTs or other conventional motor drive switching devices in certain embodiments, thereby allowing or facilitating upgrading of existing drives.

The inventors have appreciated that silicon carbide switching devices may advantageously provide benefits compared with IGBTs and other silicon-based switches in motor drive applications, whether for active rectification in the rectifier stage 30, an intermediate DC/DC converter feeding the inverter 50, an auxiliary power supply DC/DC converter and/or in driving the motor load using a switching inverter 50. For instance, silicon carbide switching devices S1-S12 provide improved (e.g. higher) bandgap energy, and better (e.g., higher) thermal conductivity compared with silicon IGBTs. Moreover, the wide bandgap silicon carbide switching devices S1-S12 may provide higher breakdown electric field, and are capable of higher blocking voltages, higher switching frequencies, and higher junction temperatures than silicon devices.

Figure 5:
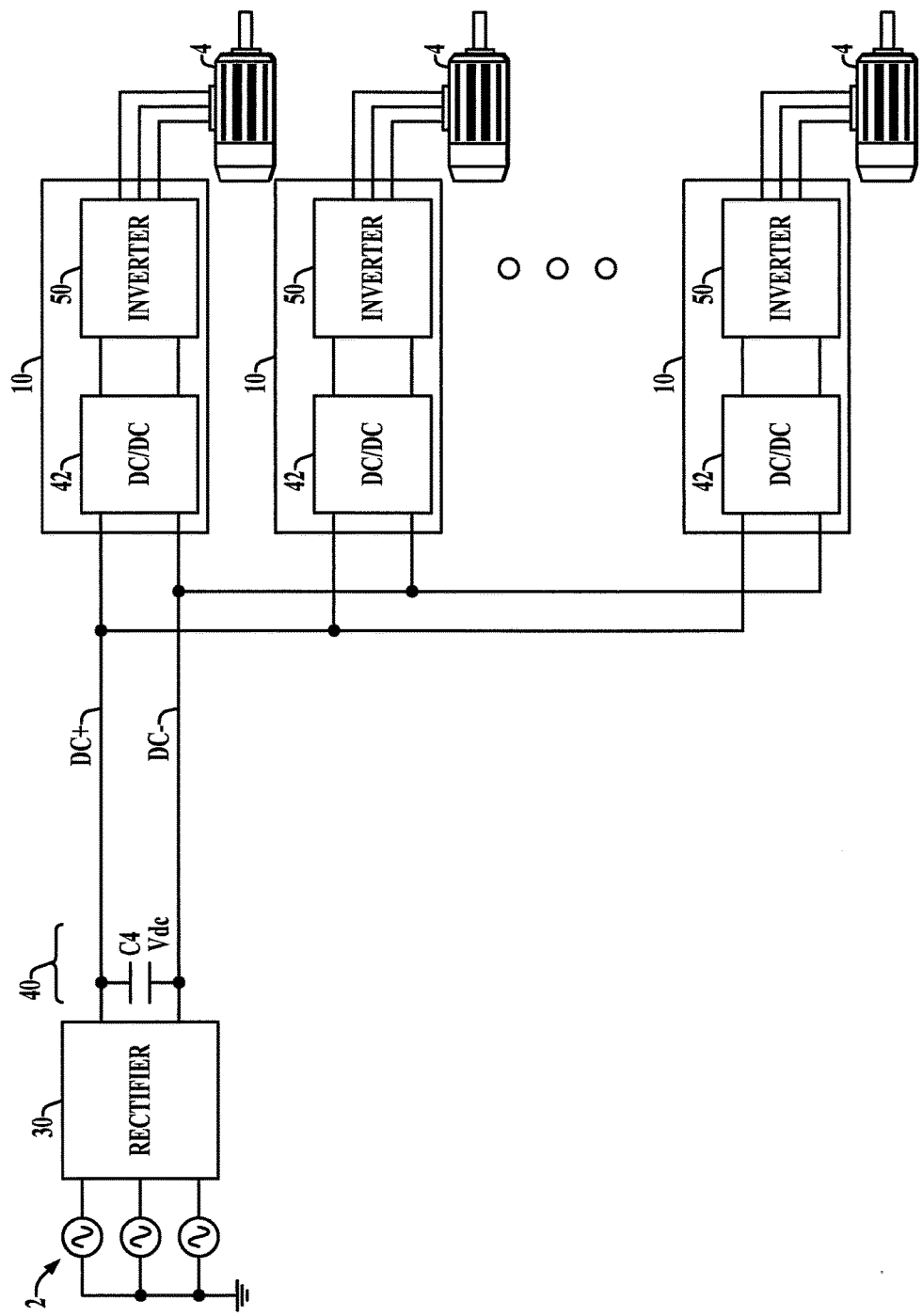
FIG. 5 is a schematic diagram.
Figure 6:
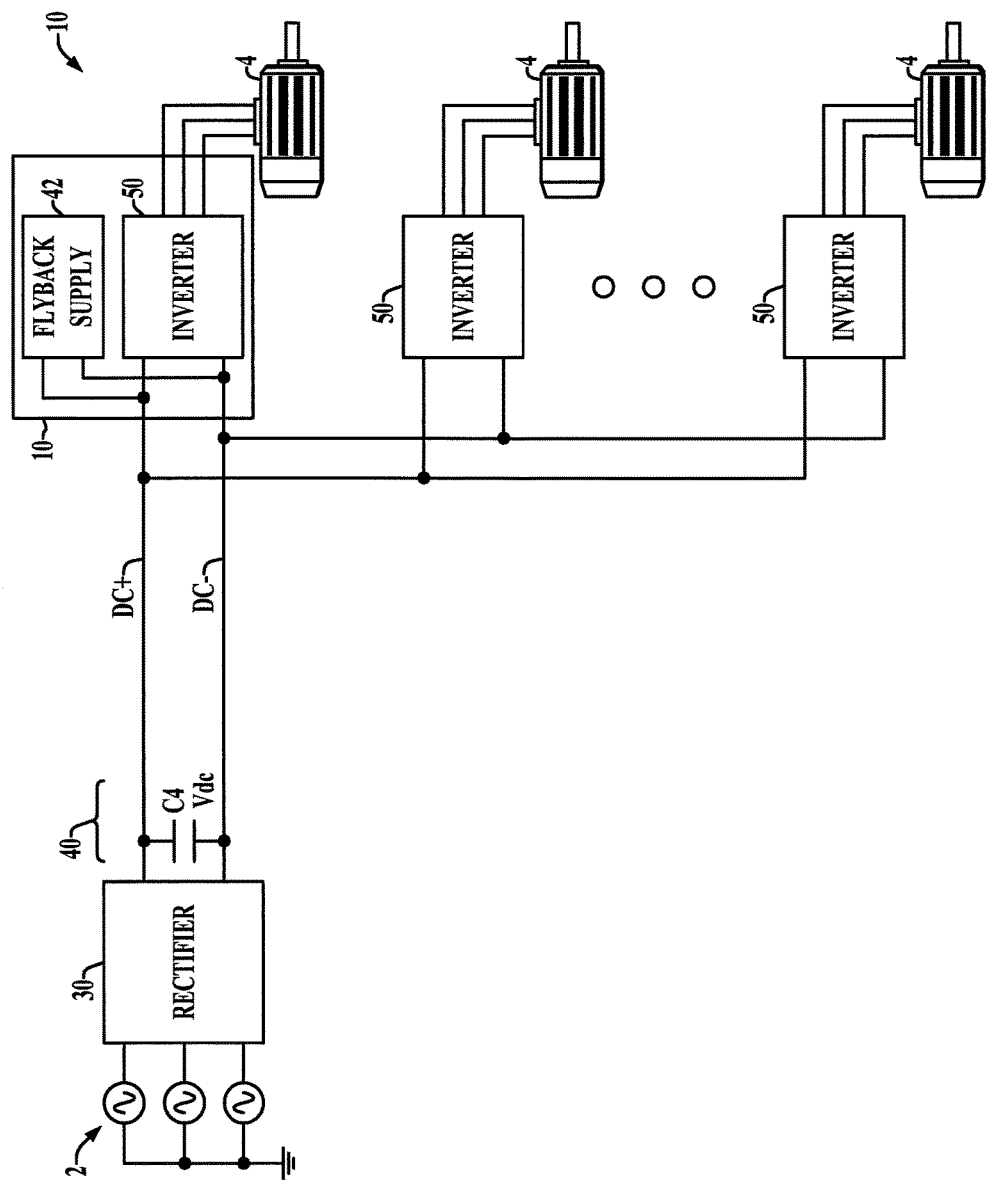
FIG. 6 is a schematic diagram.

Referring now to FIGS. 5 and 6, FIG. 5 illustrates a power conversion system embodiment including DC/DC converter stages 42 within each of a plurality of motor drive 10 for providing DC input power to the associated inverters 50. The DC/DC converters 42 in this example are powered from a shared DC bus via first and second DC bus connections DC+ and DC−. The DC/DC converters 42 can be used for a variety of purposes, including without limitation providing individualized DC inputs to the associated inverters 50. The input rectifier 30 can be a passive rectifier in certain embodiments, or the input rectifier 30 can be an active front end switching rectifier for performing power factor correction and other functions in the shared DC bus system. FIG. 6 shows another system configuration with a single rectifier 30 providing a DC output shared among a plurality of inverters 50, including a drive 10 having an inverter 50 and an auxiliary DC/DC converter supply 42 receiving input power from the shared DC bus via lines DC+ and DC−. In this example, the inverters 50 each receive DC input power at the same DC voltage level, as does the DC/DC converter 42. The disclosed concepts can be employed in any type or form of DC/DC converter, wherein the illustrated flyback converters 42 are merely a non-limiting example.

The inventors have appreciated that noise or voltage fluctuations on the shared DC bus lines may result from switching operation of the various connected drives inverters 50 and any other loads such as the DC/DC converter 42 in FIG. 6. In accordance with the present disclosure, the inverters 50, the DC/DC converters 42 and/or a switching input rectifier 30 include one or more silicon carbide switching devices, for example, silicon carbide MOSFETs. In the inverters 50 and/or a switching input rectifier 30, moreover, the silicon carbide switches may be operatively coupled with an associated one of the first and second DC bus lines DC+ and DC−, respectively. The inventors have further appreciated that fluctuations or noise on an associated DC bus line DC+ or DC− can affect switching operation of the host converter stage 30, 42 and/or 50. In this regard, the threshold voltage VT associated with silicon carbide MOSFET devices generally decreases with increasing operating temperature, and the inventors have appreciated that use of silicon carbide MOSFET switches in one or more of the converter stages 30, 42 and/or 50 in the presence of fluctuations along the DC+ and/or DC− bus lines may inhibit the ability to reliably ensure the off-state using conventional gate driver circuitry.

Figure 7:
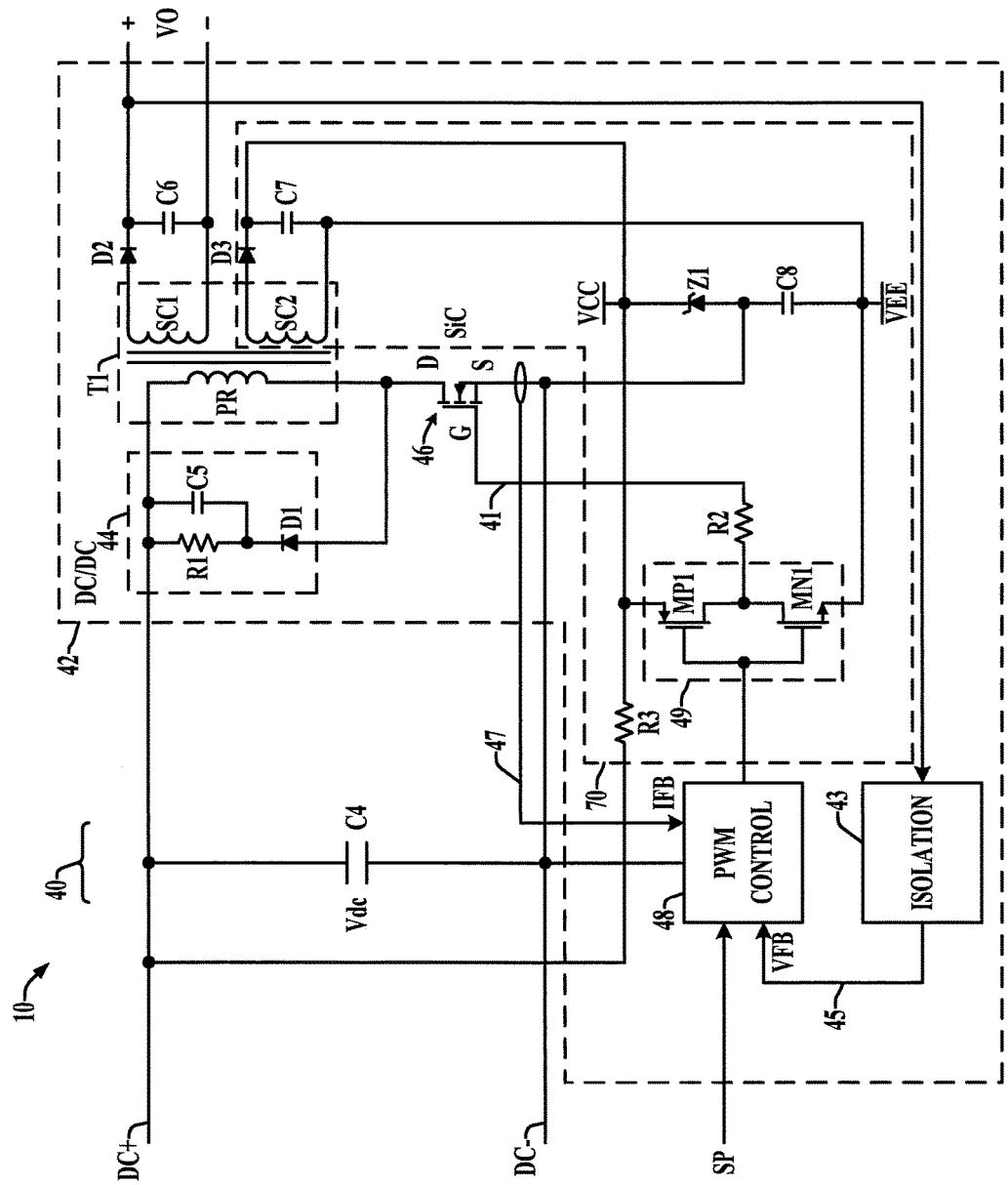
FIG. 7 is a schematic diagram.

Referring also to FIG. 7, further aspects of the present disclosure provide driver circuitry 70 for providing switching control signals which can be used with enhancement mode devices and/or with depletion mode silicon carbide switches in first and second states respectively above and below the associated DC bus connection. In the example of FIG. 7, the DC/DC converter 42 is a single switch flyback converter which can be used as an auxiliary power supply for providing control power for circuitry of a motor drive power conversion system 10. In other examples, the flyback DC/DC converter 42 can be used as an intermediate converter receiving DC input power from a shared rectifier 30 and providing a DC output for use by an associated switching inverter 50 (e.g., FIG. 5 above). The DC/DC converter 42 in FIG. 7 provides an output voltage VO and receives DC input power from the first and second DC bus connections DC+ and DC−. The converter 42 includes a silicon carbide converter switching device 46 operative to provide a DC output via a flyback transformer T1 according to a converter switching control signal 41 received from a driver circuit 70. The driver circuit 70 in this example provides the converter switching control signal 41 to the gate G of the silicon carbide MOSFET device 46 in a first state at a first voltage above the voltage of the associated DC bus connection DC− in order to turn the N-channel device 46 on, thereby allowing current to flow from the DC+ bus connection through a primary winding PR of the transformer T1 to the lower DC bus connection DC−. A primary winding reset circuit 44 is connected in parallel with the primary winding PR, and includes a series connection of a first diode D1 and first resistor R1, with a capacitor C5 connected in parallel with the resistor R1 as shown. The driver circuit 70 also provides the converter switching control signal 41 in a second state at a second voltage below the voltage of the DC− bus connection in order to turn the silicon carbide MOSFET device 46 off. The alternating on and off states of the silicon carbide MOSFET switch 46 provide alternating current in first and second secondary windings SC1 and SC2, respectively, of the transformer T1. In this example, the secondary winding SC1 provides alternating current to a rectifier diode D2 and a filter capacitor C6 is connected from the cathode of D2 to the lower winding connection of the secondary winding SC1 to provide a DC output voltage VO for use in powering one or more control circuits of a motor drive conversion system 10 and/or for use as an input to a switching inverter 50 (e.g., FIG. 5 above).

The illustrated silicon carbide switching device 46 is an N-channel enhancement mode MOSFET having a gate terminal G, a drain terminal D and a source terminal S as shown in FIG. 7. In addition, the silicon carbide MOSFET 46 has a nominally positive threshold voltage VT, which decreases with increasing switch operating temperature. The inventors have appreciated that provision of a negative off-state gate-source voltage VGS by the driver circuit 70 provides additional assurance that the switch 46 will be reliably in the off state even in the presence of shifting voltages along the corresponding DC bus connection DC−, and even at elevated operating temperatures with corresponding reduced (e.g., positive) MOSFET threshold voltage levels. In the embodiment of FIG. 7, the driver circuit 70 includes a driver supply circuit formed by the secondary winding SC2, a rectifier diode D3 and a filter capacitor C7 to provide a DC voltage between a first voltage node VCC and a second voltage node VEE of the driver circuit 70. The driver supply circuitry further includes a Zener diode Z1 with an anode connected to an intermediate node, and a capacitor C8 connected between the intermediate node and the second voltage node VEE. In addition, the intermediate node is connected to the lower DC bus connection DC−.

In operation of one non-limiting example, the driver supply circuit including the secondary winding SC2, the diode D3 and the capacitor C7 provides a voltage of approximately 25 V DC between VCC and VEE, and the Zener diode Z1 has a Zener voltage of approximately 20 V. In this regard, the output voltage of the driver supply circuit can be tailored by adjustment of the turns ratio between the primary winding PR and the secondary winding SC2 of the transformer T1, with the positive and negative voltage levels at the voltage nodes VCC and VEE relative to the intermediate node being set by the Zener voltage of Z1. Moreover, the intermediate node of the branch circuit formed by Z1 and C8 is connected to the lower DC bus connection DC−. Thus, in steady state operation, the voltage (relative to DC−) of the first voltage node VCC is approximately 20 V according to the Zener voltage of Z1, and the voltage at VEE is approximately −5 V DC. In addition, a resistance R3 is connected from the first DC bus connection DC+ to initially provide voltage to the VCC node, where the resistance R3 can be a string of multiple resistors in certain embodiments.

The driver circuit 70 in the example of FIG. 7 includes a driver stage 49 with a PMOS transistor MP1 and an NMOS transistor MN1 receiving a control signal from a pulse width modulation (PWM) controller 48 and providing a switching control signal output 41 through a resistance R2 to the gate G of the switching device 46. In this example, the PWM controller 48 provides a pulse width modulated output based on a setpoint input SP and on a current feedback signal 47 (IFB) representing the switching current flowing through the silicon carbide MOSFET switch 46 and a voltage feedback signal 45 (VFB) from an isolation circuit 43 representing the DC/DC converter output voltage VO. In a first state with the PWM controller output low, MP1 is on and the N-channel silicon carbide enhancement mode MOSFET 46 is on. In a second state with the PWM controller output high, MP1 is off and MN1 is on and the switching control signal 41 is pulled negative relative to the source voltage (DC1) to ensure that the switch 46 is off.

The illustrated DC/DC converter 42 of FIG. 7 advantageously employs a single silicon carbide MOSFET switch 46, and may be used in one example for the DC bus of a 690 VAC drive with a blocking voltage rating for the switch 46 of 1700 V and current rating above 4 A. Unlike typical silicon MOSFET devices of similar current rating having a maximum voltage rating of only 1500 V, the illustrated design is a single switch flyback configuration. Use of conventional silicon MOSFET switching devices for DC bus applications of a 690 VAC drive would require the use of two MOSFET switches to accommodate the high DC bus voltage. Thus, the use of silicon carbide switching devices in an auxiliary power supply or other flyback DC/DC converter advantageously reduces the number of switching devices, thereby saving cost and space.

Figure 8:
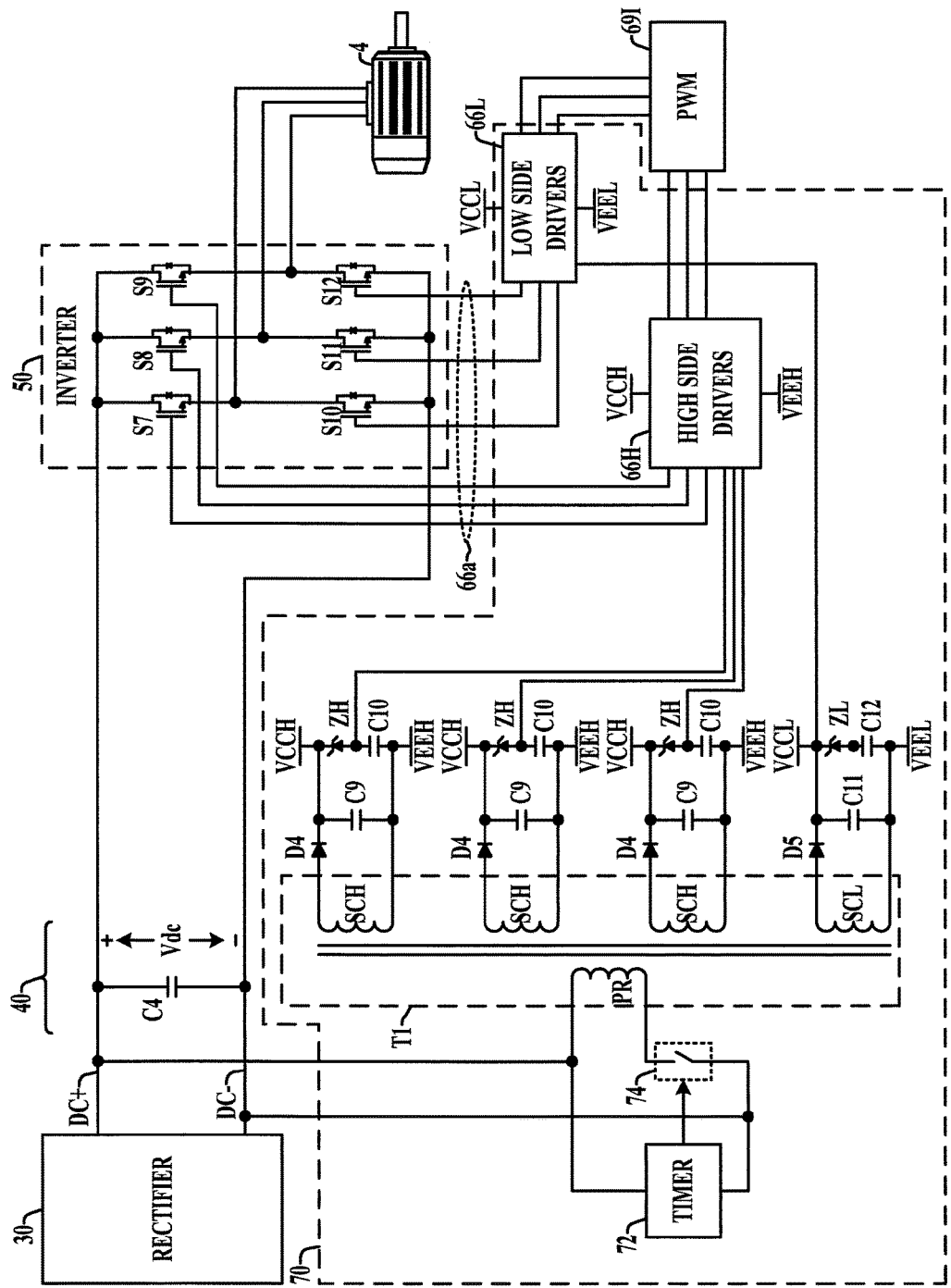
FIG. 8 is a schematic diagram.

FIG. 8 shows another conversion system configuration with a rectifier 30 (active or passive) and an output bus capacitance C4 providing a DC bus voltage Vdc on bus connection lines DC+ and DC−, and a switching inverter 50 including silicon carbide MOSFET switching devices S7-S12 including enhancement type high side switches S7-S9 with source terminals coupled with DC+ and enhancement type low side switches S10-S12 with source terminals coupled with DC−. The high side switches S7-S9 are controlled by inverter switching control signals from a high side driver circuit 66H based on signaling from an inverter pulse width modulation (PWM) circuit 691. In this case, the high side switching control signals 66a are provided at first states at or near a corresponding positive voltage VCCH for turning on the MOSFET and second states at or near a voltage VEEH for turning off the MOSFET, where each upper or high side switch is driven by a corresponding driver in the circuit 66H and each individual high side driver is provided with a corresponding set of supply lines VCCH and VEEH referenced to the respective silicon carbide MOSFET source. The low side silicon carbide switches S10-S12 are provided with switching control signals 66a from a low side driver circuit 66L according to signaling from the PWM circuit 691 at first and second states at corresponding voltages VCCL and VEEL, where VCCL is a positive voltage for turning on the MOSFET and VEEL is a negative voltage for turning off the MOSFET. In one example as shown in FIG. 8, the low side switches are driven using a common set of supply lines VCCL and VEEL. In another example, the low side switches are individually driven using a corresponding set of supply lines VCCL and VEEL.

As seen in FIG. 8, the driver circuit 70 also includes driver supply circuits generating the voltages VCCH, VEEH, VCCL and VEEL. In this example, a transformer T1 includes a primary winding PR connected in series with a switch 74 between DC+ and DC−, with the switch 74 being operated by a timer circuit 72 in order to selectively conduct current through the primary winding PR to generate current flow in first and second secondary windings SCH and SCL. This example include three high side supply secondaries SCH and associated rectifier supply circuits D4 and C9 with a zener ZH and capacitor C10 individually referenced to the respective silicon carbide MOSFET source of the associated high side inverter switch S7-S9. The secondary windings SCH and SCL are coupled with rectifier diodes D4 and D5 and output capacitors C9 and C 11 to provide the voltages at the nodes VCCH, VEEH, VCCL and VEEL, for example, 25 V DC for supplying the high and low side driver circuits 66H and 66L, respectively. The individual high side driver supply circuits in this example each include a Zener diode ZH coupled between VCCH and a first intermediate node coupled with the MOSFET source terminal, along with a capacitor C10 coupled between the MOSFET source terminal and VEEH. For a Zener voltage of approximately 20 V, and a transformer turns ratio providing 25 V DC between VCCH and VEEH, the high side driver voltage VCCH in a first state is approximately 20 V above the MOSFET source terminal node to ensure turn on of the high side switches S7-S9 and the voltage VEEH is approximately 5 volts below the MOSFET source terminal node to turn off the high side silicon carbide switches. In this manner, the driver circuit 70 provides adequate gate voltage headroom to ensure complete turnoff of each of the enhancement mode silicon carbide MOSFET high side switching devices S7-S9, even in the presence of noise on the DC bus and/or high operating temperature and the corresponding reduced silicon carbide MOSFET threshold voltage levels.

As further shown in FIG. 8, the low side driver supply circuitry provided by the secondary winding SCL, rectifier diode D5, capacitors C11 and C12, and a low side supply Zener ZL is set in one example with appropriate turns ratio to provide approximately 25 V DC between VCCL and VEEL, with the intermediate node joining ZL and C12 being coupled with the MOSFET source terminal, which is the same as the second DC bus connection DC−, thereby operating in conjunction with the low side driver circuit 66L to provide low side switching control signals at VCCL of approximately 20 V above the voltage of DC− and VEEL approximately 5 V below the voltage of DC−. Driven at these voltage levels, the silicon carbide MOSFET low side switching devices S10-S12 are ensured to be properly turned on and off even at high operating voltages and temperatures in the presence of noise or other voltage transients on the DC− bus connection.

It is noted in the example of FIG. 8 that the driver supply voltages VCCH, VEEH, VCCL and VEEL are provided generally independent of the operation of the inverter 50 as these are derived from the DC bus voltage Vdc. Thus, establishment of the DC bus voltage prior to operation of the inverter 50 ensures that the driver supply voltages VCCH, VEEH, VCCL and VEEL are at the desired levels by operation of the timer circuit 72 and the switch 74 prior to use in generating the inverter switching control signals 66a.

Figure 9:
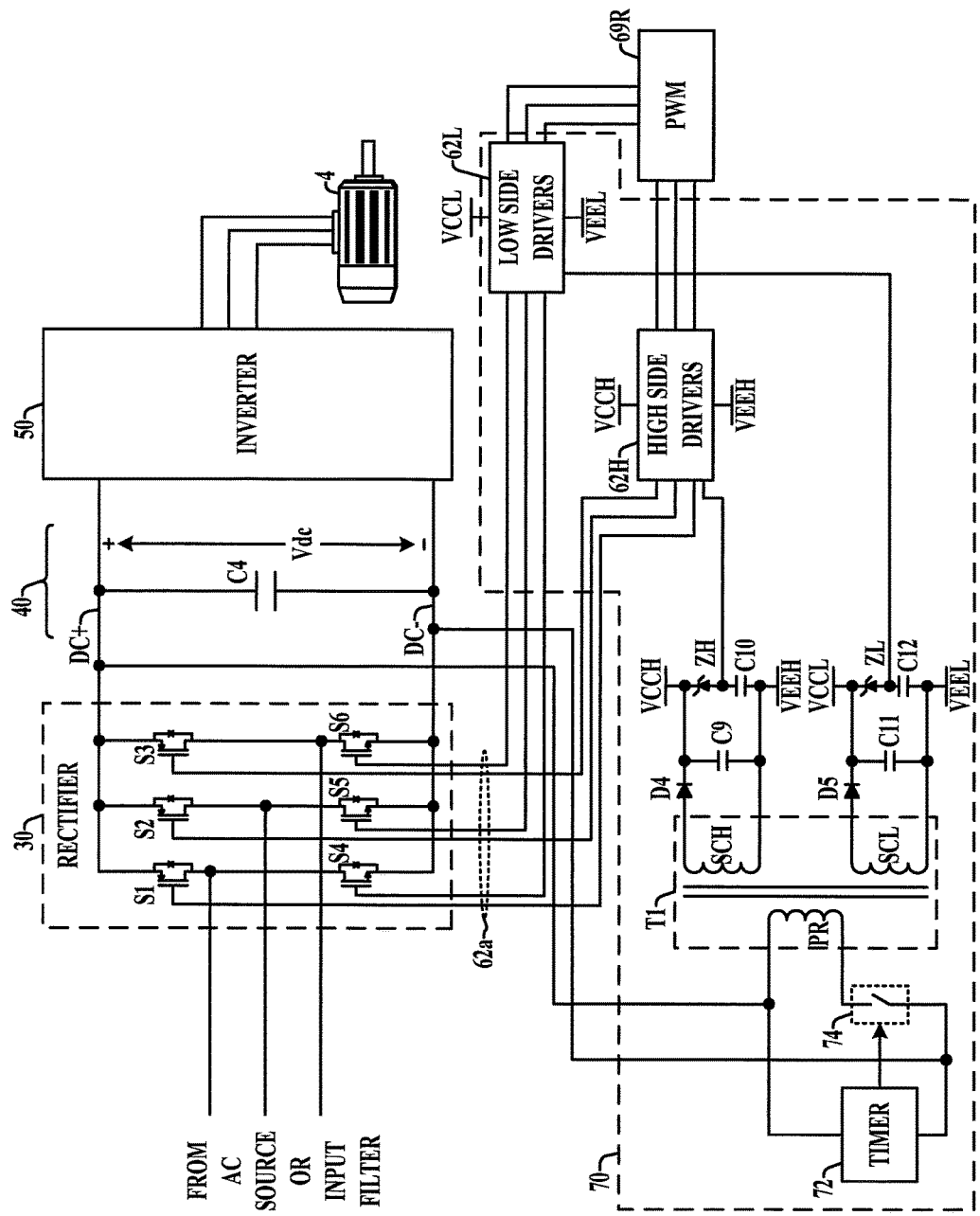
FIG. 9 is a schematic diagram.

FIG. 9 illustrates use of similar driver circuitry 70 for providing switching control signals to silicon carbide high side active rectifier switching devices S1-S3 at first and second states with voltages respectively above and below the voltage of the first DC bus connection DC+ via high side driver circuitry 62H provided with supply voltages VCCH and VEEH from a setoff three high side driver supply circuits (only one illustrated in FIG. 9) individually including a secondary winding SCH, a diode D4, a Zener ZH and capacitors C9 and C 10 generally as described above in connection with FIG. 8. In addition, the low side rectifier switching devices S4-S6 (N-channel silicon carbide MOSFET switches) are driven by low side driver circuitry 62L to provide switching control signals 62a at first and second levels VCCL and VEEL respectively above and below the voltage of DC− via supply circuitry SCL, D5, ZL, C11 and C12. The primary winding PR of the transformer T1 in this embodiment is connected between the DC bus lines DC+ and DC− and is driven generally as described above in connection with FIG. 8 to provide the advantageous silicon carbide MOSFET switching device driver signal levels via the driver circuit 70 using the driver DC supply voltages between VCCH and VEEH and between VCCL and VEEL independent of actual switching operation of the active rectifier 30.

Figure 10:
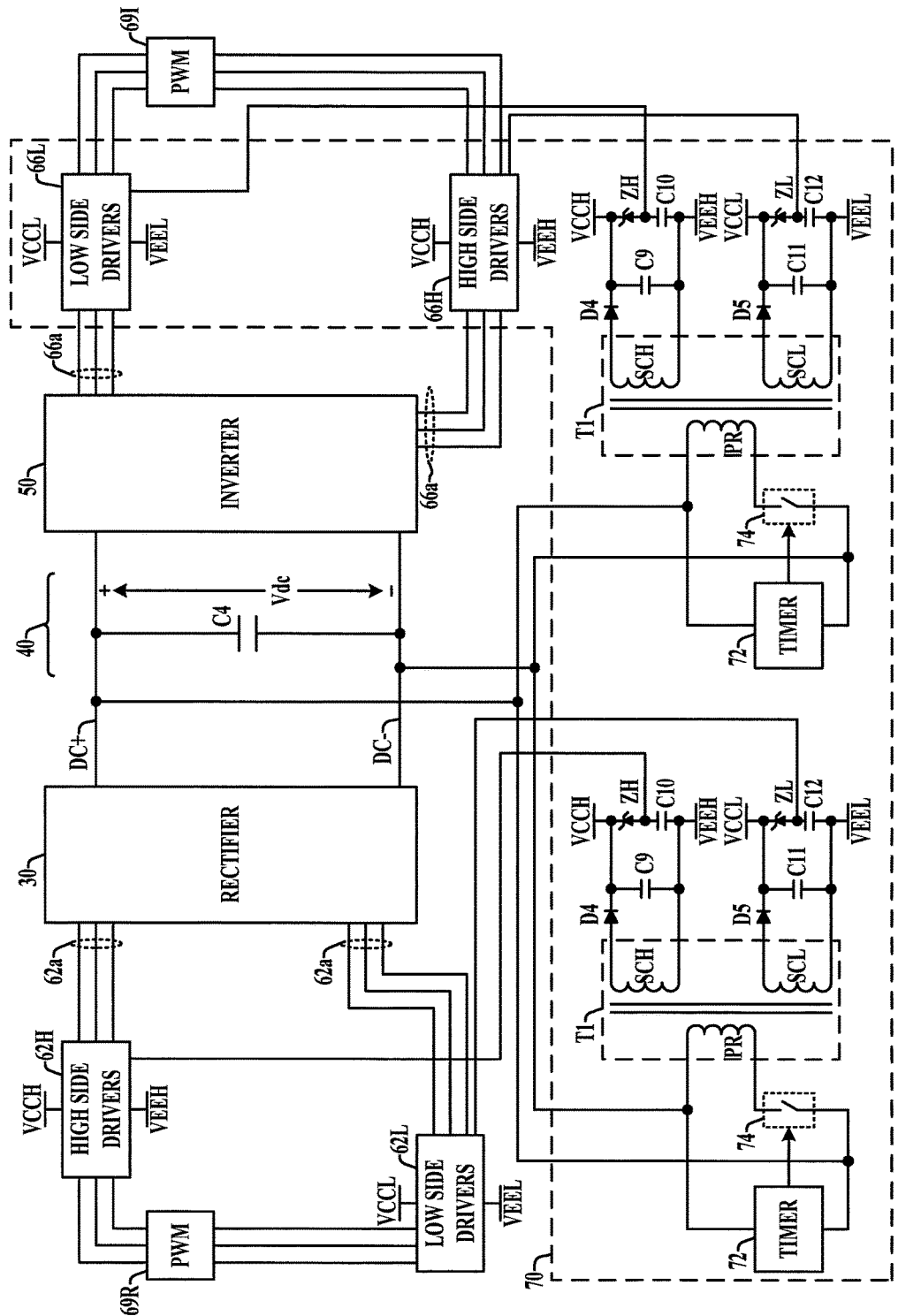
FIG. 10 is a schematic diagram.

FIG. 10 illustrates another non-limiting example in which an active rectifier 30 and a switching inverter 50 include silicon carbide MOSFET switching devices, where the high side rectifier switching devices are controlled using switching control signal 62a from high side driver circuitry 62H (e.g., as described above in connection with FIG. 9) at switch-specific voltage levels VCCH and VEEH according to signals from a rectifier PWM circuit 69R, and the low side rectifier switching devices are driven by signals 62a at levels VCCL and VEEL from low side driver circuitry 62L based on signals from the PWM circuit 69R. Also in this example, the switching inverter 50 includes silicon carbide high side devices driven using signals 66a from a high side driver circuit 66H at switch-specific levels VCCH and VEEH, and the silicon carbide low side inverter switches are driven at levels VCCL and VEEL by low side driver circuitry 66L (e.g., as described above in connection with FIG. 8). The driver circuitry 70 includes separate driver supply circuits for the rectifier 30 and the inverter 50, each creating the driver voltages VCCH, VEEH, VCCL and VEEL via a transformer primary winding PR connected to the DC bus lines DC+ and DC− generally as described above in connection with FIG. 8. In this configuration, the controlled driver voltage levels are provided independent of operation of the switching devices of the rectifier 30 and of the switching devices of the inverter 50, and can accommodate operation at elevated temperatures (e.g., lowered silicon carbide MOSFET threshold voltages) and/or noise or other voltage deviations in the DC bus voltage Vdc. In this manner, various benefits of the use of silicon carbide switching devices and motor drives and other power conversion systems are facilitated.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
    an active rectifier comprising a plurality of silicon carbide rectifier switching devices coupled to receive AC input power from an external power source, and operative to provide a DC output signal according to a plurality of rectifier switching control signals, the active rectifier including a plurality of low side silicon carbide switches operatively coupled with a DC bus connection;
    a switching inverter to convert the DC output signal to provide an AC output to drive a load;
    a controller operative to generate the rectifier switching control signals to operate the rectifier switching devices; and
    a driver circuit operative to provide a set of the switching control signals to the low side silicon carbide switches in a first state at a first voltage above a voltage of the DC bus connection and in a second state at a second voltage below the voltage of the DC bus connection; and
    a driver supply circuit, including:
    a first voltage node providing a first supply voltage to the driver circuit for providing the set of the switching control signals in the first state at the first voltage above the voltage of the DC bus connection,
    a second voltage node providing a second supply voltage to the driver circuit for providing the second set of the switching control signals in the second state at the second voltage below the voltage of the DC bus connection,
    an intermediate node connected to the DC bus connection,
    a zener diode with an anode connected to the intermediate node and a cathode connected to the first voltage node to provide a positive voltage at the first voltage node with respect to the intermediate node,
    a capacitor connected between the intermediate node and the second voltage node to provide a negative voltage at the second voltage node with respect to the intermediate node, and
    a DC supply providing a positive DC voltage between the first and second voltage nodes.

2. The power conversion system of claim 1, wherein the low side silicon carbide switches are enhancement mode devices.

3. The power conversion system of claim 1, wherein the low side silicon carbide switches are depletion mode devices.

4. The power conversion system of claim 1, wherein the power conversion system is a voltage source converter motor drive.

5. The power conversion system of claim 1, wherein the power conversion system is a current source converter motor drive.

6. The power conversion system of claim 1, wherein the low side silicon carbide switches are P-channel silicon carbide MOSFETs.

7. The power conversion system of claim 1, wherein the low side silicon carbide switches are N-channel silicon carbide MOSFETs.

8. The power conversion system of claim 1:
    wherein the rectifier includes:
        a plurality of high side silicon carbide switches operatively coupled with a first DC bus connection, wherein the plurality of low side silicon carbide switches are operatively coupled with a second DC bus connection; and
    wherein the driver circuit is operative to:
        provide a second set of switching control signals to the high side silicon carbide switches in a first state at a third voltage above a voltage of the first DC bus connection and in a second state at a fourth voltage below the voltage of the first DC bus connection.

9. The power conversion system of claim 8, wherein the driver supply circuit includes:
    a second driver supply circuit, including:
        a third voltage node providing a third supply voltage to the driver circuit for providing the second set of the switching control signals in the first state at the third voltage above the voltage of the first DC bus connection, a fourth voltage node providing a fourth supply voltage to the driver circuit for providing the second set of the switching control signals in the second state at the fourth voltage below the voltage of the first DC bus connection, a second intermediate node, a second zener diode with an anode connected to the second intermediate node and a cathode connected to the third voltage node to provide a positive voltage at the third voltage node with respect to the second intermediate node, a second capacitor connected between the second intermediate node and the fourth voltage node to provide a negative voltage at the fourth voltage node with respect to the second intermediate node, and a second DC supply providing a positive DC voltage between the third and fourth voltage nodes.

10. The power conversion system of claim 9, wherein the first DC supply includes a first transformer secondary winding and a rectifier; and wherein the second DC supply includes a second transformer secondary winding and a second rectifier.

11. The power conversion system of claim 8, wherein the low side silicon carbide switches are enhancement mode devices.

12. The power conversion system of claim 8, wherein the low side silicon carbide switches are depletion mode devices.

13. The power conversion system of claim 11, comprising:

a driver supply circuit, including:

a first voltage node providing a first supply voltage to the driver circuit for providing the set of the switching control signals in the first state at the first voltage above the voltage of the DC bus connection, a second voltage node providing a second supply voltage to the driver circuit for providing the second set of the switching control signals in the second state at the second voltage below the voltage of the DC bus connection, an intermediate node connected to the DC bus connection, a zener diode with an anode connected to the intermediate node and a cathode connected to the first voltage node to provide a positive voltage at the first voltage node with respect to the intermediate node, a capacitance connected between the intermediate node and the second voltage node to provide a negative voltage at the second voltage node with respect to the intermediate node, and a DC supply providing a positive DC voltage between the first and second voltage nodes.

14. The power conversion system of claim 13, wherein the DC supply includes a transformer secondary winding and a rectifier.

15. A power conversion system, comprising:

an inverter comprising a plurality of inverter switching devices coupled to receive DC input power and operative to provide an AC output to drive a load according to a plurality of inverter switching control signals;

a DC/DC converter receiving DC input power and comprising at least one silicon carbide converter switching devices operatively coupled with a DC bus connection to provide a DC output signal to the inverter according to at least one converter switching control signal;

a driver circuit operative to provide the at least one converter switching control signal to the at least one silicon carbide converter switching device in a first state at a first voltage above a voltage of the DC bus connection and in a second state at a second voltage below the voltage of the DC bus connection; and a driver supply circuit, including:

a first voltage node providing a first supply voltage to the driver circuit for providing the set of the switching control signals in the first state at the first voltage above the voltage of the DC bus connection, a second voltage node providing a second supply voltage to the driver circuit for providing the second set of the switching control signals in the second state at the second voltage below the voltage of the DC bus connection, an intermediate node connected to the DC bus connection, a zener diode with an anode connected to the intermediate node and a cathode connected to the first voltage node to provide a positive voltage at the first voltage node with respect to the intermediate node, a capacitor connected between the intermediate node and the second voltage node to provide a negative voltage at the second voltage node with respect to the intermediate node, and a DC supply providing a positive DC voltage between the first and second voltage nodes.

16. The power conversion system of claim 15, wherein the DC supply includes a transformer secondary winding and a rectifier.

17. The power conversion system of claim 15, wherein the DC/DC converter provides control power for circuitry of the system.

18. The power conversion system of claim 15, wherein the at least one silicon carbide converter switching device is an enhancement mode silicon carbide MOSFET.

19. The power conversion system of claim 15, wherein the DC/DC converter is a flyback converter including a transformer primary winding coupled between a first DC bus connection and the at least one silicon carbide converter switching device, the at least one silicon carbide converter switching device being coupled between the transformer primary winding and a second DC bus connection to control current flow in the transformer primary winding, and wherein the driver circuit is operative to provide the at least one converter switching control signal to the at least one silicon carbide converter switching device in the first state at a first voltage above a voltage of the second DC bus connection and in a second state at a second voltage below the voltage of the second DC bus connection.

20. The power conversion system of claim 19, comprising:

a driver supply circuit, including:

a first voltage node providing a first supply voltage to the driver circuit for providing the set of the switching control signals in the first state at the first voltage above the voltage of the DC bus connection, a second voltage node providing a second supply voltage to the driver circuit for providing the second set of the switching control signals in the second state at the second voltage below the voltage of the DC bus connection, an intermediate node connected to the DC bus connection, a zener diode with an anode connected to the intermediate node and a cathode connected to the first voltage node to provide a positive voltage at the first voltage node with respect to the intermediate node, a capacitor connected between the intermediate node and the second voltage node to provide a negative voltage at the second voltage node with respect to the intermediate node, and
a transformer secondary winding and a rectifier providing a positive DC voltage between the first and second voltage nodes.

* * * * *